(12) United States Patent
Enomoto

(10) Patent No.: US 7,136,542 B2
(45) Date of Patent: Nov. 14, 2006

(54) IMAGE RETRIEVAL METHOD

(75) Inventor: Jun Enomoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 827 days.

(21) Appl. No.: 10/354,165

(22) Filed: Jan. 30, 2003

(65) Prior Publication Data
US 2003/0164965 A1  Sep. 4, 2003

(30) Foreign Application Priority Data
Jan. 30, 2002  (JP) .............................. 2002-021294

(51) Int. Cl.
G06K 9/54 (2006.01)
(52) U.S. Cl. .................. 382/305; 358/1.9; 358/1.16; 355/18; 355/40; 353/25; 353/26 R; 353/27 R
(58) Field of Classification Search ................ 382/100, 382/299, 305, 276, 293, 298; 358/527, 403, 358/526, 1.9, 1.16; 355/18, 27, 40, 41; 348/445, 526; 353/25, 26 R, 27 R, 26 A
See application file for complete search history.

(56) References Cited

U.S. PATENT DOCUMENTS

| 4,597,794 | A | | 7/1986 | Ohta et al. | |
|---|---|---|---|---|---|
| 5,198,907 | A | * | 3/1993 | Walker et al. | 358/296 |
| 5,383,029 | A | * | 1/1995 | Kojima | 358/403 |
| 5,406,350 | A | * | 4/1995 | Wilcox et al. | 355/41 |
| 5,748,173 | A | * | 5/1998 | Gur | 345/629 |
| 5,897,694 | A | | 4/1999 | Woolf | |
| 5,909,514 | A | * | 6/1999 | Murayama et al. | 382/254 |
| 5,958,561 | A | | 9/1999 | Held | |
| 6,146,769 | A | | 11/2000 | Anton | |
| 6,489,087 | B1 | * | 12/2002 | Polykarpov et al. | 430/362 |
| 6,710,896 | B1 | * | 3/2004 | Takaoka | 358/1.9 |
| 6,781,724 | B1 | * | 8/2004 | Szajewski et al. | 358/487 |
| 6,937,363 | B1 | * | 8/2005 | Yamaguchi | 358/1.9 |
| 2002/0130939 | A1 | | 9/2002 | Jacob | |

FOREIGN PATENT DOCUMENTS

| DE | 199 30 986 A1 | 1/2000 |
|---|---|---|
| DE | 199 30 858 A1 | 2/2000 |
| EP | 0 212 655 A2 | 3/1987 |

(Continued)

OTHER PUBLICATIONS

U.S. Appl. No. 09/556,513 corresponds to Japanese Patent Laid-Open Publication No. 2001-007965.

(Continued)

Primary Examiner—Sheela Chawan
(74) Attorney, Agent, or Firm—Sughrue Mion, PLLC

(57) ABSTRACT

The image retrieving method causes image processing information concerning image processing performed on an image to be output as a processed image and data for retrieval for the image to correspond to each other and registers them in the database in advance for each of images in an order corresponding to that of arrangement of frames of a film, and further registers the data for retrieval even for unprocessed images in the database in the order. The method, upon reprocessing, reads from the film a plurality of images including an image to be reprocessed, calculates data for retrieval for the plurality of images thus input, and retrieves the image processing information for the image to be reprocessed from the database using the data for retrieval for the image to be reprocessed and for an image in at least one of frames adjacent to the image to be reprocessed on the film.

14 Claims, 5 Drawing Sheets

FOREIGN PATENT DOCUMENTS

| | | |
|---|---|---|
| EP | 1158029 A1 | 11/2001 |
| JP | 08-283636 A | 10/1996 |
| JP | 09-055834 | 2/1997 |
| JP | 09-173407 A | 6/1997 |
| JP | 09-179211 | 7/1997 |
| JP | 2000-222437 | 8/2000 |
| JP | 2001-7965 | 1/2001 |
| JP | 2001-052175 | 2/2001 |

OTHER PUBLICATIONS

U.S. Appl. No. 09/448,301 corresponds to Japanese Patent Laid-Open Publication No. 2000-222437.

"Flatbed Laminating Systems & Services", Process Heating Engineering and Equipment, p. 42-45.

International Search Report (PCT/US 03/04327) dated Jan. 7, 2003.

* cited by examiner

IMAGE RETRIEVAL METHOD

BACKGROUND OF THE INVENTION

1. Field of the Invention

The present invention relates to a technical field of a print system for outputting a print (photograph) on which an image photographed on a film is reproduced, and in particular, to an image retrieval method allowing an image on a print made on the occasion of film processing and that on a reprint to suitably match each other in such a print system.

2. Description of the Related Art

Up to now, so-called direct exposure for projecting an image on a film onto a photosensitive material (photographic paper) and then performing exposure on the photosensitive material has been a main technique in printing of an image photographed on a photographic film (hereinafter, referred to simply as a film) such as a negative film or a reversal film onto a photosensitive material.

On the other hand, a printer utilizing digital exposure, that is, a digital photographic printer has recently been put into practical use. In the digital photographic printer, an image recorded on a film is photoelectrically read. The read image is converted to a digital signal, which is then subjected to various image processing operations so as to obtain image data for recording. A photosensitive material is subjected to scanning exposure with recording light which has been modulated in accordance with the obtained image data so as to record an image (latent image), thereby obtaining a (finished) print.

The digital photographic printer basically includes: a scanner (image reader) for making reading light incident on a film and reading its projected light so as to photoelectrically read an image recorded on the film; an image processor for performing predetermined processing on image data read by the scanner or image data supplied from a digital camera or the like so as to obtain image data for image recording, that is, an exposure condition; a printer (image recorder) for performing scanning exposure on a photosensitive material, for example, by light beam scanning in accordance with the image data output from the image processor so as to record a latent image; and a processor (developing unit) for performing development processing on the photosensitive material exposed by the printer so as to obtain a (finished) print on which the image is reproduced.

In such a digital photographic printer, images can be processed as digital image data to adjust images, so various operations including the correction of washed-out highlights and flat (dull) shadows due to the taking of pictures with rear light or an electronic flash, sharpening, and the like can be performed in an effective manner to produce prints of the high quality that has been unattainable by the conventional direct exposure.

Moreover, according to the digital photographic printer, even an image photographed by a digital camera or the like can be output as a print.

Not only in such a digital photographic printer but also an analog photographic printer utilizing direct exposure, for a print output from an image photographed on a film, so-called reprinting for reoutputting an image (frame) which has already been printed once as a print is often performed in accordance with the request of a reprint and the like.

In this case, unless a modification is otherwise indicated, it is required that the image reproduced on a previously output print (normally, a print made on the occasion of film processing for reproducing and outputting an image photographed on a photographic film) and the image on a reprint match each other.

However, due to differences in decisions or operations by operators, the previous print and the reprint have often different image colors and densities, leading to many customer complaints.

In order to cope with this problem, for example, a print system allowing a reorder to be placed without dealing with a film has been proposed in JP 09-55834 A or JP 09-179211 A.

In addition, a printing system for efficiently performing the retrieval of image processing information is disclosed in, for example, JP 2000-222437 A and JP 2001-7965 A. Furthermore, an image retrieval device is disclosed in JP 2001-52175 in which a plurality of characteristic amounts are extracted to produce a characteristic vector which is used to retrieve an image similar to the target image from the reference image database where data of plural reference images is stored.

In these prior art documents, image processing is performed during reprinting under the same image processing conditions as those of the printing with film processing so as to obtain the identical image in the reprint and the print made on the occasion of film processing. For this purpose, the image processing conditions of the printing with film processing are recorded in a database along with its image data, so that the database is retrieved during the reprinting so as to fetch out the image processing conditions of the printing with film processing.

However, the conventional image retrieval method has disadvantages in low retrieval performance, retrieval errors due to frame detection errors (positional shift of a frame), and degradation of retrieval efficiency due to a difference in retrieval conditions between printing with film processing and reprinting.

SUMMARY OF THE INVENTION

In view of the above problems, the present invention has an object of providing an image retrieval method for enhancing the retrieval performance and for setting the same retrieval conditions for the printing with film processing and the reprinting so as to improve retrieval efficiency and to allow the prevention of retrieval errors.

In order to attain the object described above, the first aspect of the present invention provides a method for retrieving an image from a database, wherein a plurality of images photographed on a film are photoelectrically read and one among the plurality of images thus input is subjected to image processing to be output as a processed image, comprising:

causing image processing information concerning the image processing performed on an image to be output as the processed image on one hand, and data for retrieval used for retrieving the image on the other, to correspond to each other and registering them in the database in advance for each of images subjected to the image processing to be output as processed images, with registering being carried out in an order corresponding to that of arrangement of frames of the film;

registering the data for retrieval even for unprocessed images in the database in the order corresponding to that of arrangement of frames of the film;

reading, upon reprocessing, from the film a plurality of images including an image to be reprocessed;

calculating data for retrieval for the plurality of images thus input; and retrieving the image processing information for the image to be reprocessed from the database using the data for retrieval for the image to be reprocessed and for an image in at least one of frames adjacent to the image to be reprocessed on the film.

Further, in order to attain the object described above, the second aspect of the present invention provides a method for retrieving an image from a database, wherein a plurality of images photographed on a film are photoelectrically read and one among a plurality of images thus input is subjected to image processing to be output as a processed image, comprising:

causing image processing information concerning the image processing performed on an image to be output as the processed image on one hand, and data for retrieval used for retrieving the image on the other, to correspond to each other and registering them in the database in advance for each of images subjected to the image processing to be output as processed images and not for unprocessed images, with registering being carried out in an order corresponding to that of arrangement of frames of the film;

reading, upon reprocessing, from the film a plurality of images including an image to be reprocessed;

calculating data for retrieval used for retrieving the plurality of images thus input; and retrieving the image processing information for the image to be reprocessed from the database using the data for retrieval for the image to be reprocessed and for an image in at least one of frames adjacent to the image to be reprocessed on the film.

In each of the above-mentioned aspects, it is preferable that, in addition to the data for retrieval for the image, or further additionally the image processing information for the image, i.e., the data for retrieval and the image processing information for the image, at least one selected from among image information on the image, image data on the image, and compressed image data on the image is recorded in the database, as being caused to correspond to the data for retrieval or the image processing information.

Further, preferably, at least one selected from among an image characteristic quantity of the image, image information on the image, and compressed image data on the image is used as the data for retrieval for the image.

Further, preferably, an image characteristic quantity of the image is used as the data for retrieval for the image.

Preferably, when the reprocessing is to be performed (and the retrieval is not successful or said image to be reprocessed is not hit), a frame position for reading the image to be reprocessed from one of frames of the film is subjected to fine adjustment, the image to be reprocessed is then read, data for retrieval used for retrieving the image thus input is calculated, and, using the data for retrieval calculated, retrieval within the database is again performed.

And, preferably, the data for retrieval registered for the images are arranged in the database in an order same as that of arrangement of the images on the film.

Further, preferably, when the image processing information on the image to be reprocessed is retrieved from the database, retrieval is performed initially using the data for retrieval for the image to be reprocessed and the image in at least one of the frames adjacent to the image to be reprocessed on the film and if the retrieval is not successful, then using at least the data for retrieval for the image to be reprocessed and without using the data for retrieval for the image in at least one of the frames (using neither of data for retrieval for the images in said frames adjacent to said image to be reprocessed).

DESCRIPTION OF THE PREFERRED EMBODIMENTS

Hereinafter, an image retrieval method according to the present invention will be described in detail, based on preferred embodiments illustrated in the accompanying drawings.

Figure 1:
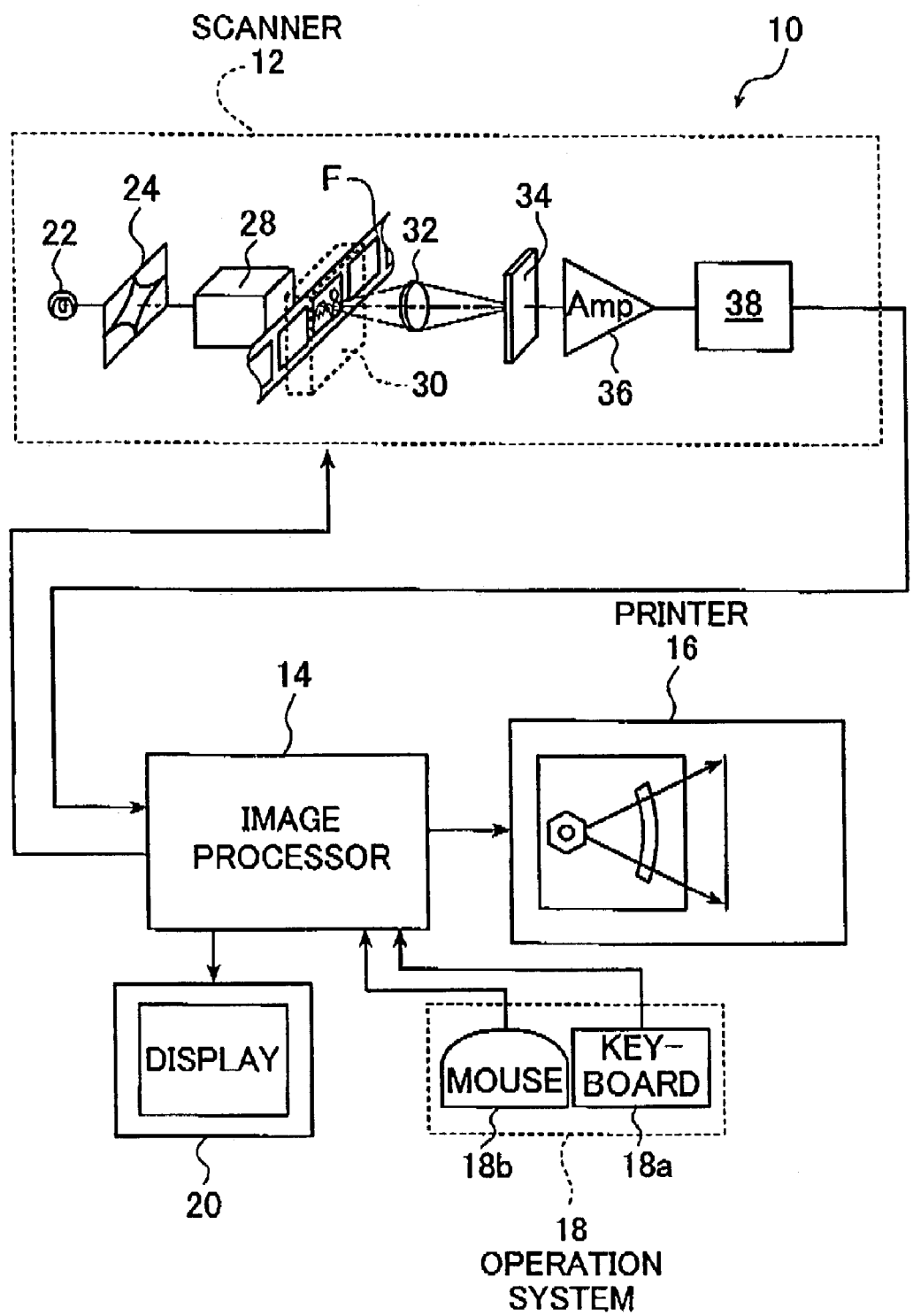
FIG. 1 is a block diagram showing a schematic configuration of an embodiment of a digital photographic printer including an image processor for implementing an image retrieval method according to the present invention.

FIG. 1 is a block diagram showing a schematic configuration of an embodiment of a digital photographic printer including an image processor for implementing an image retrieval method according to the present invention.

A device configuration for executing the image retrieval method of the present invention is not limited to such a digital photographic printer; it may alternatively be a conventional analog photographic printer employing direct exposure for printing an image on photographic paper with projected light from a film.

A digital photographic printer (hereinafter, referred to simply as a photoprinter) 10 shown in FIG. 1 basically includes: a scanner (image reader) 12 for photoelectrically reading an image photographed on a film F as image data; an image processor 14 for processing the read image data to obtain image data for output as well as for performing the operation, the control and the like of the entire photoprinter 10; and a printer 16 for exposing a photosensitive material (photographic paper) with a light beam modulated in accordance with the image data for output which is output from the image processor 14 to record the image on the photosensitive material and for performing development processing so as to output it as a (finished) print.

An operation system 18 including a keyboard 18a and a mouse 18b for inputting or setting various conditions, selecting and instructing a specific processing operation, and inputting an instruction for color/density correction or the like, and a display 20 for displaying an image read by the scanner 12, various operational instructions, a screen for setting/registering conditions and the like are connected to the image processor 14.

The scanner 12 photoelectrically reads an image photographed on the film F and the like. The scanner 12 includes a light source 22, a variable diaphragm 24, a diffusion box 28 for uniformizing reading light made incident on the film F in a plane direction of the film F, an imaging lens unit 32, an image sensor 34 having line CCD sensors corresponding to the reading of the respective R (red), G (green), and B (blue) images, an amplifier 36, and an A/D (analog/digital) converter 38.

A dedicated carrier 30, which is removably attached to a main body of the scanner 12, is prepared in the photoprinter 10 in accordance with the kind or the size of a film such as an Advanced Photo System (hereinafter, referred to simply as APS) or a 135-size negative (or reversal) film, the form of a film such as a strip or a slide, and the like. By replacing the carrier 30 with another, various kinds of processing operations can be performed using various kinds of films. An image (frame) photographed on the film F and provided for print production is conveyed to a predetermined reading position by the carrier 30.

In such a scanner 12, upon reading the image photographed on the film F, reading light emitted from the light source 22, whose light amount is adjusted by the variable diaphragm 24, is made incident on the film F placed at a predetermined reading position by the carrier 30 so as to be transmitted therethrough. As a result, the projected light bearing the image photographed on the film F is obtained.

The carrier 30 includes a pair of carrier rollers for conveying the film F to a predetermined reading position and a mask having a slit for regulating projected light from the film F to a predetermined slit-like form in the same direction (main scanning direction) as the line CCD sensors extend. The carrier 30 places the film F at a predetermined reading position. The reading light is made incident on the film F while the film F is being conveyed so that a longitudinal direction of the film F conforms with an auxiliary scanning direction perpendicularly crossing a main scanning direction. As a result, the film F goes through two-dimensional slit scanning with the reading light by the slit formed in the main scanning direction and an image of each frame photographed on the film F is thus read.

A magnetic recording medium is formed on the APS film. A magnetic head for recording/reading information on/from the magnetic recording medium is placed on the carrier 30 compatible with the APS film (cartridge). The information recorded on the magnetic recording medium of the film F is read by this magnetic head so as to be sent to the image processor 14 and the like. In addition, information from the image processor 14 and the like is transferred to the carrier 30 so as to be recorded on the magnetic recording medium of the film F by the magnetic head.

On the carrier 30, there is arranged a code reader for reading barcodes such as a DX code, an extension DX code and an FNS code, which are optically recorded on the film F, or various kinds of information optically recorded on the film F. Various kinds of information read by this code reader is sent to the image processor 14.

As described above, the reading light transmits through the film F held by the carrier 30 so as to be projected light bearing the image. The projected light forms an image on a light-receiving surface of the image sensor 34 by the imaging lens unit 32.

The image sensor 34 is a so-called three-line color CCD sensor for respectively reading an R image, a G image and a B image, each sensor extending in the main scanning direction. The projected light from the film F is decomposed into three primary colors R, G and B by the image sensor 34 so as to be photoelectrically read.

An output signal of the image sensor 34 is amplified in the amplifier 36, and is converted into a digital signal by the A/D converter 38 so as to be sent to the image processor 14.

In the scanner 12, the image reading is performed twice so as to read the image photographed on the film F, i.e., prescan for reading the image at a low resolution and fine scan for obtaining image data of an output image.

Prescan is performed under preset prescan reading conditions that ensure that the images on all films to be handled by the scanner 12 can be read without saturating the image sensor 34. Fine scan uses the prescanned data and is performed under fine scan reading conditions that are set for each frame such that the image sensor 34 is saturated at a slightly lower density than the minimum density of the image (frame) of interest. Therefore, the output signals for prescan and fine scan are different from each other only in resolution and output level.

In the present invention, the scanner 12 is not limited to a scanner for performing such slit scanning. The scanner 12 may also be a scanner for performing plane exposure to read the entire surface of an image of one frame at a time. In such a case, for example, an area CCD sensor is utilized, and color filters of R, G and B are sequentially inserted between the light source and the film F. Then, an image is read by the area CCD sensor so as to decompose the image photographed on the film F into three primary colors for sequential reading.

As described above, an output signal (image data) from the scanner 12 is output to the image processor 14.

In the photoprinter 10, the image processor 14 may receive, in addition to the images of the film F read by the scanner 12, image data from various image data supply sources including image reading means such as an image reader for reading an image on a reflection copy, image pick-up means such as an image pick-up device such as a digital camera or a digital video camera, communication means such as a LAN (Local Area Network) or a computer communication network, image data recording means such as media (recording mediums), for example, a memory card, an MO (magneto-optical recording medium) and a photo CD, and the like so as to perform processing operations as described below.

Figure 2:
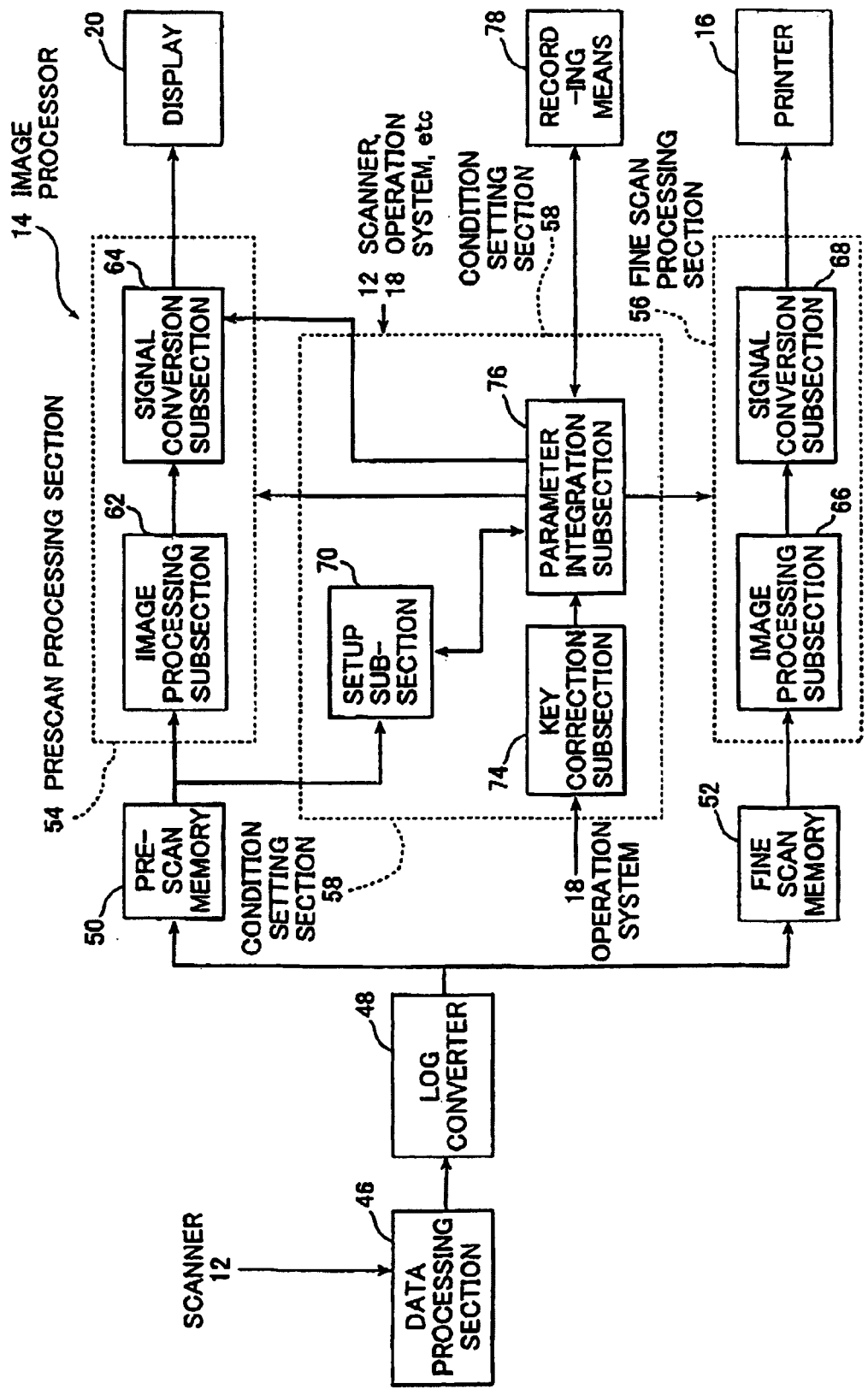
FIG. 2 is a block diagram showing a schematic configuration of an embodiment of the image processor of FIG. 1.

FIG. 2 is a block diagram showing a schematic configuration of an embodiment of the image processor 14.

In this embodiment, image processing information concerning an image processing operation performed on an image subjected to image processing in the printing with film processing is registered, together with data for image retrieval for the image that is caused to correspond to the image, in a database as the information to be used for producing a reprint (information for reprocessing or reprinting) in the order corresponding to that of arrangement of the frames of a film from which images are read (the first and second aspects of the present invention). If necessary, data for image retrieval for unprocessed images are also registered in the database in the order corresponding to that of arrangement of the frames of the film (the first aspect of the present invention). Preferably, in addition to such information and data as above, at least one selected from among image information on each image, image data on each image, and compressed image data on each image is registered in the database, as being caused to correspond to the data for image retrieval or the image processing information. When reprinting (reprocessing) is requested, the film is scanned so as to input images. The information for reprinting of the image, which is designated to be reprinted, is retrieved from the database by using the data for image retrieval for the image designated to be reprinted and for an image in one of the frames adjacent to the image to be reprinted on the film. Reprocessing of the image designated to be reprinted is performed using the retrieved information (information for reprinting) including the image processing information to produce a reprint on which the same image is reproduced as on a print made on the occasion of film processing.

An image retrieval method according to the present invention will be described below in detail.

As shown in FIG. 2, the image processor 14 includes a data processing section 46, a Log converter 48, a prescan (frame) memory 50, a fine scan (frame) memory 52, a prescan processing section 54, a fine scan processing section 56 and a condition setting section 58.

FIG. 2 mainly shows the sections related to image processing. Besides the above-described sections, the image processor 14 includes a CPU for controlling and managing the entire photoprinter 10 including the image processor 14, a memory for storing information necessary for the operation of the photoprinter 10 or the like, means for determining a F-number of the variable diaphragm 24 or an accumulation time of the image sensor 34 and the like. The operation system 18 and the display 20 are connected to each section via the CPU (CPU bus) and the like.

Each of output signals of R, G, and B output from the scanner 12 is subjected to predetermined data processing operations such as DC offset correction, dark current correction, and shading correction in the data processing section 46. The processed signal is converted by the Log converter 48 to digital image data so that prescan (image) data is stored in the prescan memory 50 while the fine scan (image) data is stored in the fine scan memory 52.

The prescan data stored in the prescan memory 50 is processed in the prescan processing section 54 so as to be converted into image data corresponding to display by the display 20 whereas the fine scan data stored in the fine scan memory 52 is processed in the fine scan processing section 56 so as to be converted into image data corresponding to an output by the printer 16.

The prescan processing section 54 includes an image processing subsection 62 and a signal conversion subsection 64, whereas the fine scan processing section 56 includes an image processing subsection 66 and a signal conversion subsection 68.

The image processing subsection 62 of the prescan processing section 54 and the image processing subsection 66 of the fine scan processing section 56 are both the sections for performing image processing on the image (image data) read by the scanner 12 in accordance with the setting in the condition setting section 58 described below. The image processing subsection 62 and the image processing subsection 66 basically perform the same processing except for a difference in pixel density of image data to be processed.

Image processing in the image processing subsections 62 and 66 include various known image processing operations. As examples thereof, one or more processing operations selected from: gray balance adjustment, gradation adjustment, density adjustment (color density correction), electron magnification processing, sharpness (sharpening) processing, film grain compensation processing, dodging processing (providing dodging effects in a print system employing direct exposure by image data compression while maintaining a half tone), geometric distortion correction, marginal luminosity correction, red-eye correction, special finishing such as soft-focus or black and white finishing, and the like are given.

Each of these processing operations may be performed by a known method, utilizing a suitable combination of a processing computation (algorithm), processing through an adder or a subtracter, processing with a LUT (look-up table), a matrix (MTX) computation, processing with a filter, and the like.

The signal conversion subsection 64 of the prescan processing section 54 converts the image data processed through the image processing subsection 62 by use of a 3D-LUT (three-dimensional lookup table) and the like so as to convert it into image data corresponding to display by the display 20. On the other hand, the signal conversion subsection 68 of the fine scan processing section 56 converts the image data processed through the image processing subsection 66 by use of a 3D-LUT and the like so as to convert it into image data corresponding to image recording by the printer 16 and to supply this image data to the printer 16.

The conditions for conversion process in these signal conversion subsections 64 and 68 are both set in the condition setting section 58.

The conditions for image processing and conversion process in the prescan processing section 54 and the fine scan processing section 56 are set by the condition setting section 58.

The condition setting section 58 includes a setup subsection 70, a key correction subsection 74 and a parameter integration subsection 76. Recording means 78 for recording the image processing information concerning image processing performed on the input image and the data for image retrieval caused to correspond to the image processing information, that is used for specifying the input and then processed image, is connected to the parameter integration subsection 76. The recording means 78 also serves as an image database. Information to be recorded in the recording means 78 is the information for reprinting provided for reprinting process, that is used for performing the same image processing in reprinting as in printing with film processing so as to reproduce the same image on a reprint as on a print made on the occasion of film processing. The information for reprinting includes the image processing information such as image processing condition (including type, order, etc. of image processing operations) concerning the image processing performed on the image of interest in the printing with film processing and the data for image retrieval such as an image characteristic quantity, which is used for retrieving the image processing information such as image processing condition, and further includes as required, one or more selected from among the image information on the image, the image data on the image, especially the compressed image data obtained by compressing the image data on the image, and so forth. Upon reprinting, the parameter integration subsection 76 uses the data for image retrieval to perform a retrieval within the recording means 78 (image database), thereby reading out the image processing information, and the image information etc. or the image (image data) as required, for reprinting process.

The image processing information is such information as used for repeating the same image processing in reprinting of an image as in printing of the same image with film processing and may be any information as long as it enables the repetition of the image processing, that is to say, the type of image processing operations performed, the order of the image processing operations, and the image processing condition encompassing conditions for various kinds of image processing (parameters and data related thereto), in the printing with film processing. Particular examples of those to be repeated include the type of image processing operations performed, the order of the image processing operations, as well as the image processing condition such as an LUT or an operational expression, which is produced for image processing, set values and the like of various parameters used for image processing including a coefficient related to a predetermined image processing and DCMY key correction information input by an operator, and even certain data related thereto.

The data for image retrieval is such data as an image characteristic quantity, which is caused to correspond to the image processing information (condition) used for performing image processing on an image in the printing with film processing, and then recorded and used for the image retrieval within the database (recording means 78) in order to specify the image. It is also possible to use the compressed image data or the image data as it is before or after, preferably before, image processing as the data for image retrieval. In that case, however, the retrieval requires more time, although rendered more accurate, because of the increased amount of data used for retrieval. Consequently, it is preferable that the data for image retrieval is not image data itself, but consists of mere numeric values extracted from an image as is the case with an image characteristic quantity. Owing to this data for image retrieval, an image is specified among, for example, hundreds of thousands of frames registered in a database (recording means 78).

The image information is formal information on the image of interest, which may be used as data for retrieval or auxiliary data thereof. Examples of the image information include the frame number (No.) of the image of interest, FID (film identification code), film type, camera model, customer ID, image-specific ID, date (day, month, and year) of acceptance of an order, ID of a laboratory where an order was accepted, machine ID, ordering, film format (ASP, 135-size, Brownie-size, etc.), type of film carrier, film mask, the date and time (day, month, year, and time of day) of photographing, image format (BMP, JPEG, etc.), and ordering terminal ID.

The compressed image data is used for representing the result of image retrieval on the display 20 in order to confirm whether or not the correct image data is read out by the retrieval. Therefore, the compressed image data does not need to have extremely high image quality. Although it is apparent that the image data for representing the result of image retrieval on the display 20 is not necessarily required to be compressed, it is desirable to compress the image data in view of a capacity of a hard disk and the like. Moreover, a compression method is not particularly limited; for example, JPEG and the like are suitably given as examples. The compressed image data for such a use may be that obtained before or after image processing, the compressed image data after image processing being more preferred.

In the case where it appears that the result of retrieval is not correct, candidate images (compressed images) in several frames may be represented on the display 20 using, for example, compressed image data so that an operator can select a correct image from them.

In the case where the result of retrieval is not displayed, it is not necessary to store the compressed image data. Therefore, the memory capacity of the recording means 78 (database) can be reduced by the amount of the compressed image data. Correspondingly, a processing rate can be increased. In the case where the compressed image data is stored, it is efficient to fetch the data for image retrieval out from the compressed image data as image characteristic quantity data. For example, as the image characteristic quantity serving as the data for image retrieval, spatial degree data subjected to Discrete Cosine Transform (DCT) may be used. Alternatively, the image data may be blocked into blocks of a certain size so that a mean value of each block, the sum of the blocks, the maximum value, the minimum value or the like can be used.

It is usually during so-called printing with film processing for reproducing an image photographed on a photographic film and outputting the image as a print when the photographed film is subjected to development processing (development, bleach-fix, wash and drying) that the information for reprinting such as image processing information is recorded in the recording means 78 at the time of print production. Throughout the specification, such a procedure as above is defined as printing with film processing whereas other procedures of printing are all defined as reprinting. It is apparent that the information obtained in the precedent reprinting may be recorded as the information at printing with film processing in the recording means 78 so as to be used in the subsequent reprinting. More specifically, in this embodiment, the information for reprinting such as image processing information is recorded in the recording means 78 in the precedent printing such as the printing with film processing and the precedent reprinting so as to be used in the subsequent printing such as the reprinting and the subsequent reprinting. In the following description, in particular, the printing with film processing and the reprinting are described as representative examples.

The setup subsection 70 determines a reading condition for fine scan, the contents (type and order), the image processing condition, etc. of the image processing in the prescan processing section 54 and the fine scan processing section 56, the image characteristic quantity used as the data for retrieval, and so forth. More specifically, in the printing with film processing, from the prescan data, the setup subsection 70 produces a density histogram, calculates an image characteristic quantity such as a predetermined percentage point of frequency of a density histogram for a mean density, a highlight (minimum density) or a shadow (maximum density), LATD (Large Area Transmission Density), a maximum value density and a minimum value density of the histogram or the like so as to set the reading conditions for fine scan. Furthermore, the setup subsection 70 determines the image adjustment to be executed from various image processing operations and the order of execution in accordance with the density histogram, the image characteristic quantity, the instruction given by an operator and the like. Furthermore, the setup subsection 70 calculates respective image processing conditions and conversion conditions in the signal conversion subsection 68 and the like so as to supply them to the parameter integration subsection 76 together with the image characteristic quantity etc.

The key correction subsection 74 calculates the amount of adjustment for the image processing conditions in accordance with instructions input through keys set on the keyboard 18a or through the mouse 18b of the operation system 18 for color adjustment, density adjustment, contrast (gradation) adjustment and the like so as to supply the calculated amount of adjustment to the parameter integration subsection 76.

The parameter integration subsection 76 receives the image processing conditions and the like calculated by the setup subsection 70 so as to set them to predetermined sites of the prescan processing section 54 and the fine scan processing section 56. Furthermore, the parameter integration subsection 76 adjusts the image processing conditions set to each site in accordance with the amount of adjustment and the like calculated by the key correction subsection 74.

In the printing with film processing, the parameter integration subsection 76 transmits the image processing information of the frame image of interest and the calculated image characteristic quantity and the like received from the setup subsection 70 to the recording means 78 after processing for the frame image is determined. On the other hand, in the reprinting, the parameter integration subsection 76 performs retrieval within the recording means 78 so as to read out information necessary for image reproduction of the frame image to be reprinted. Then, the parameter integration subsection 76 represents the result of retrieval on the display 20 as well as supplies the necessary information to a predetermined site such as the setup subsection 70.

The recording means 78 for recording information necessary for the reproduction of the image to be reprinted, for example, the image processing information, is not particularly limited; various means can be used.

For example, various mediums such as a hard disk, a database, a flexible disk, or a magneto-optical recording medium, which are built in or connected to the image processor 14, are given as examples of the recording means 78. Moreover, the print system 10 may be connected to an external database through communication means such as a computer communication network.

The image data processed in the prescan processing section 54 of the image processor 14 is sent to the display 20, while the image data processed in the fine scan processing section 56 is sent to the printer 16.

The printer 16 includes a printing unit for performing exposure on a photosensitive material in accordance with the supplied image data so as to record a latent image and a processor (developing unit) for performing predetermined processing on the exposed photosensitive material so as to output it as a print.

In the printer 16, for example, after a photosensitive material is cut at a length of a print, a back print is recorded thereon. Then, three kinds of light beams, that is, R exposure light, G exposure light and B exposure light, are modulated in accordance with the image data output from the image processor 14 so as to be deflected in a main scanning direction. At the same time, the photosensitive material is conveyed in an auxiliary scanning direction perpendicularly crossing the main scanning direction so as to be subjected to two-dimensional scanning exposure, thereby recording a latent image thereon. Then, the photosensitive material is supplied to the processor. The processor, which has received the photosensitive material, performs predetermined wet development processing such as color development, bleach-fix, wash and the like, and then, dries the developed photosensitive material to obtain prints. Then, the prints are sorted out into such predetermined units as each corresponding to one roll of film so as to be accumulated.

Hereinafter, the functions of this embodiment will be described for both processing, i.e., in printing with film processing and reprinting, taking a 135-size film as an example.

In this embodiment, the production and storage of information required for reproducing an image such as data for image retrieval will be mainly described in the case of printing with film processing, whereas the image retrieval for the image which is designated to be reprinted by using the data for image retrieval will be mainly described in the case of reprinting. The description of usual image processing will be herein omitted.

Figure 3:
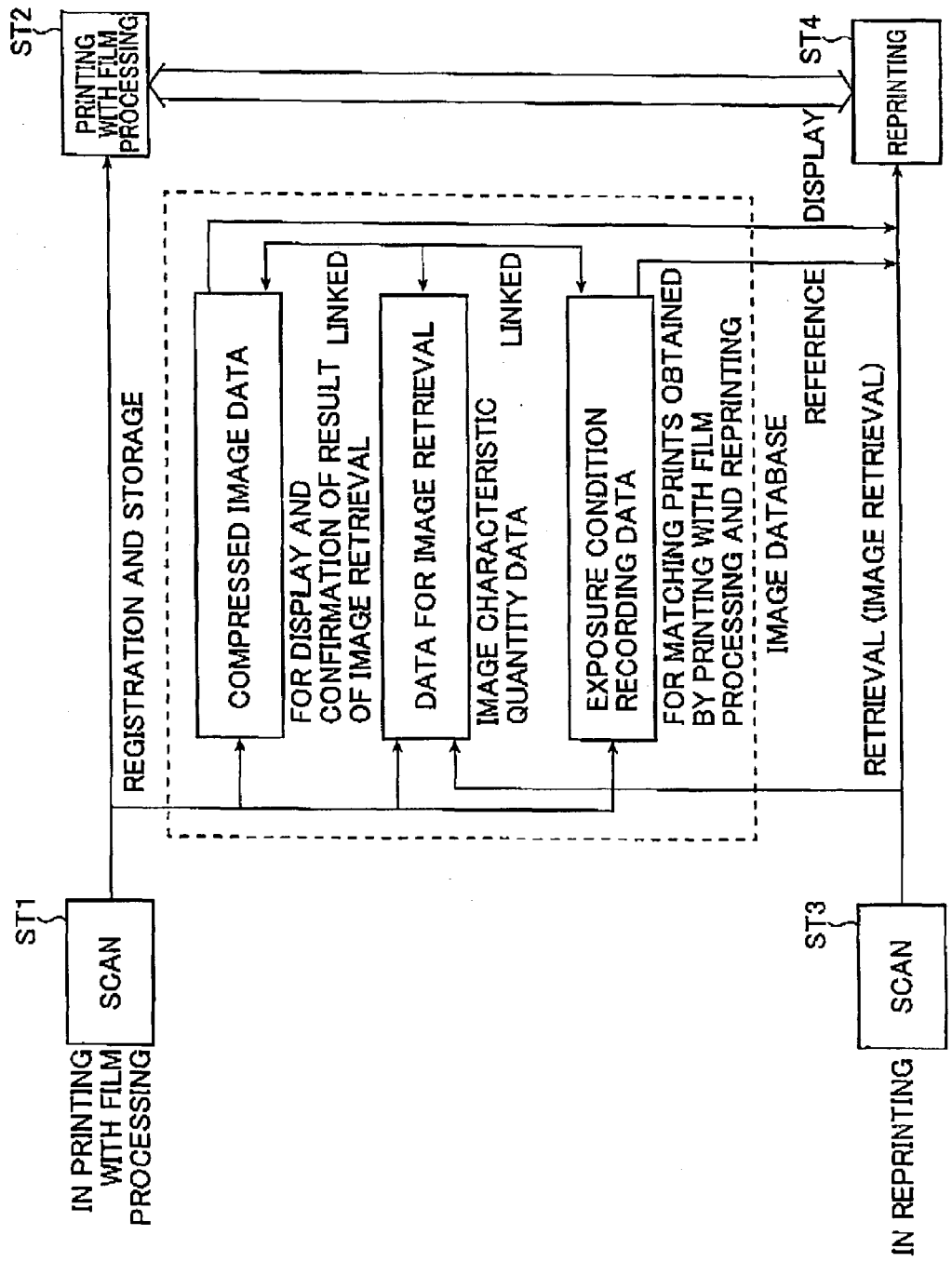
FIG. 3 is a schematic diagram showing a flow of a process of the image retrieval method of the present invention.

A schematic flow of the entire processing in the case of a 135-size film is shown in FIG. 3.

As shown in FIG. 3, in the case of printing with film processing, at step ST1, a film is scanned (prescan and fine scan) as in usual processing so as to read the image data to perform usual image processing. At the same time, information necessary to reproduce the same image as reproduced in the printing with film processing, including data for image retrieval such as image characteristic quantity, compressed image data, and image processing information (exposure condition recording data), is produced and stored in the database. At step ST2, a print made on the occasion of film processing is output from the printer 16.

In the case of reprinting, at step ST3, the film is scanned (prescan) to produce data for image retrieval such as image characteristic quantity. The image retrieval is performed by using the data for image retrieval to specify the reordered image. Then, the image processing information such as image processing condition of the reordered image in its printing with film processing is read out of the database. Image processing is performed on the image data, which is obtained by the second scan (fine scan) of the film, using the same image processing information, for example, image processing condition, as that in the printing with film processing. At step ST4, the image data is output as a reprint.

Hereinafter, these processing operations will be described further in detail.

First, in the case of printing with film processing, an operator attaches a carrier in conformity with the film F to the scanner 12 at a predetermined position so as to perform the prescan of the film F. When the prescan data is read, the setup subsection 70 performs the production of a density histogram, the calculation of the image characteristic quantity and the like from the prescan data so as to calculate the reading conditions of fine scan and the image processing condition (information). Then, the parameter integration subsection 76 sets the image processing condition (information) for each predetermined site.

Based on the thus set image processing condition (information), predetermined image processing is performed in the prescan processing section 54 so as to represent an image for verification on the display 20 (verification monitor).

Next, the operator sees the verification screen on the display 20 so as to perform the confirmation (verification) of the image. The operator adjusts (corrects) a color, a density, a gradation and the like by using the adjustment key set on the keyboard 18a and the like as the needs arise. A signal for adjustment is sent to the key correction subsection 74. The key correction subsection 74 calculates the amount of correction of the image processing condition in accordance with the input and sends the calculated amount of correction to the parameter integration subsection 76. The parameter integration subsection 76 corrects the image processing condition set for the image processing subsections 62 and 66 in accordance with the transmitted amount of correction. Accordingly, the image represented on the display 20 varies in accordance with the input by the operator.

Exposure condition recording data for the printer is produced from the image processing condition which is finally determined in the above-described process.

On the other hand, a frame number is read from the film F in parallel with the above-described processing. The image processing information such as image processing condition for the image of each frame is managed by means of the number of the relevant frame. The parameter integration subsection 76 produces the image processing information, the data for image retrieval, and the like so as to correspond to the frame number of interest and sends them to the recording means 78. The image processing information, the data for image retrieval, and the like are recorded and stored in the recording means 78 as a database. Each data (information) to be stored in the image database needs to be stored in the order corresponding to that of arrangement of the relevant frame image on the film F. Preferably, the arrangement (order) of each data (information) is the same as that of the relevant frame image on the film F. The data to be stored is stored in the database, as including at least the data for image retrieval such as image characteristic quantity for frames which are scanned and input but not processed, i.e., skipped with respect to processing (printing processing or digitizing processing), and for unexposed frames. This is for convenience of performing the subsequent retrieval by using, in addition to the data for image retrieval for the image to be retrieved, that for the image in one, or the images in both of two frames adjacent to the image (frame) to be retrieved on the film F.

The information for reprocessing which concerns the image processing necessary for the reproduction of the same image as that reproduced in the printing with film processing includes, as described above, the data for image retrieval and the image processing condition (exposure condition recording data), and in some cases additionally, the image information on the image, the image data on the image, especially the compressed image data, and the like. It is effective to use the image characteristic quantity data, which is fetched out upon production of the compressed image data, as the data for image retrieval. Preferably, the information for reprocessing which concerns image processing and is composed of the above-described data is related to at least one image information selected from among: frame number; film type; camera model; customer; image-specific ID; day, month and year of the acceptance of a print order; laboratory where a print order was accepted; machine; print ordering; film format (ASP, 135-size, Brownie-size, and the like); film carrier type; film mask; day, month, year and time of day of photographing; image format (BMP, JPEG and the like); and ordering terminal, and managed in the database.

The above-mentioned day, month, year and time of day of photographing may also be read from the image. Moreover, if the information for reprocessing concerning image processing and the like are related to various kinds of image information as much as possible as described above, the retrieval speed can be improved because such image information can be used as the data for retrieval or auxiliary data thereof. At the same time, retrieval errors can be reduced. An improvement of the retrieval speed and a reduction in retrieval errors can be achieved also by modifying an image characteristic quantity used as data for retrieval, to be more specific, by using various image characteristic quantities at a time, by using one image characteristic quantity or another in an increased data amount, or the like. For instance, one or more selected from among: a density histogram; a predetermined percentage point of frequency of a density histogram for a mean density, a highlight (minimum density) or a shadow (maximum density); LATD (Large Area Transmission Density); maximum and minimum value densities of the histogram, and so forth may be used as the image characteristic quantity.

When the image processing information such as image processing condition is set as described above, the film is then subjected to fine scanning. Next, the input from the film is subjected to the image processing using the image processing condition (information) set as above in the fine scan processing section 56 as usual. Then, the printer 16 outputs a print (print made on the occasion of film processing) on which an image photographed on the film is reproduced.

As described above, in this embodiment, the information for reprocessing such as the image processing information and the data for image retrieval is produced in printing with film processing so as to be recorded in the recording means 78. However, in the image retrieval method of the present invention, the timing of recording the related information in the recording means 78 is not limited thereto. For example, the related information may alternatively be recorded when image processing in the printing with film processing is modified in response to a request of a reprint made by a customer who is not satisfied with the image on a print made on the occasion of film processing, together with designation of color/density processing and the like. The compressed image data serves to represent the result of retrieval on the display 20 in retrieval. If a display of the result of retrieval is not particularly needed, it is not necessary to record the compressed image data. Therefore, a memory capacity can be reduced by the amount of compressed image data. It is preferred to leave a choice to record the compressed image data or not. As the timing of selection, the selection may be made for each printing with film processing. However, the timing of selection is not limited thereto. For example, the selection may be made upon installation of a device so as to preset either the recording or the non-recording of the compressed image data.

Furthermore, when the information for reprocessing such as the image processing information and the data for image retrieval is to be recorded, the number of accumulable frames may be set or the set number of frames may be modifiable, in accordance with the capability or the resource of the photoprinter, mainly, a CPU capability, a hard disk capacity or the like. The number of frames may be set, for example, based on the available capacity of the hard disk or the like upon resource check during program installation.

Moreover, it is further preferable that number of frames to be recorded in the database is variable in accordance with the installation capacity, setting region capacity, or recording region capacity, or the capability (speed) of the retrieval engine.

In the case where the image characteristic quantity data is used as the data for image retrieval, the image processing information (condition) and the image characteristic quantity data may be independently recorded as individual information. Alternatively, the image characteristic quantity data may be related to the image processing information (condition) to be packed, so that the thus obtained set of data is recorded. The image processing information (condition) may be any information as long as it allows the reproduction of a print made on the occasion of film processing. It is further preferable that date and time, a customer number and the like are added to the image processing condition.

The constituents of, for example, the information for reprocessing concerning image processing, such as the data for image retrieval, the image processing information (condition; exposure condition recording data), and the compressed image data, are related to each other. If these data are constituted so that the deletion of any one of the data allows deletion of the remaining data or so that the update of any one of the data allows update of the remaining data, it is possible to always record and manage only the necessary information. Therefore, a recording capacity is economized so as to allow efficient management of data. The update of the image processing information and the like is carried out such that, if the image processing information such as image processing condition read out during, for example, reprinting is not used as it is but the precedent processing condition is somewhat modified for improvement, the image processing information and the like are recorded so updated as containing the latest information on the condition.

It is preferred to make a backup of the data for image retrieval, the compressed image data, and the like included in, for example, the information for reprocessing concerning image processing at predetermined timing. Although this predetermined timing is not particularly limited, system startup time, inspection time at the start of operation, inspection time at the end of operation, system shut down time, system hang-up time, time when an operator gives an instruction, version-up time of software and the like are suitably given as examples of the timing.

Figure 4:
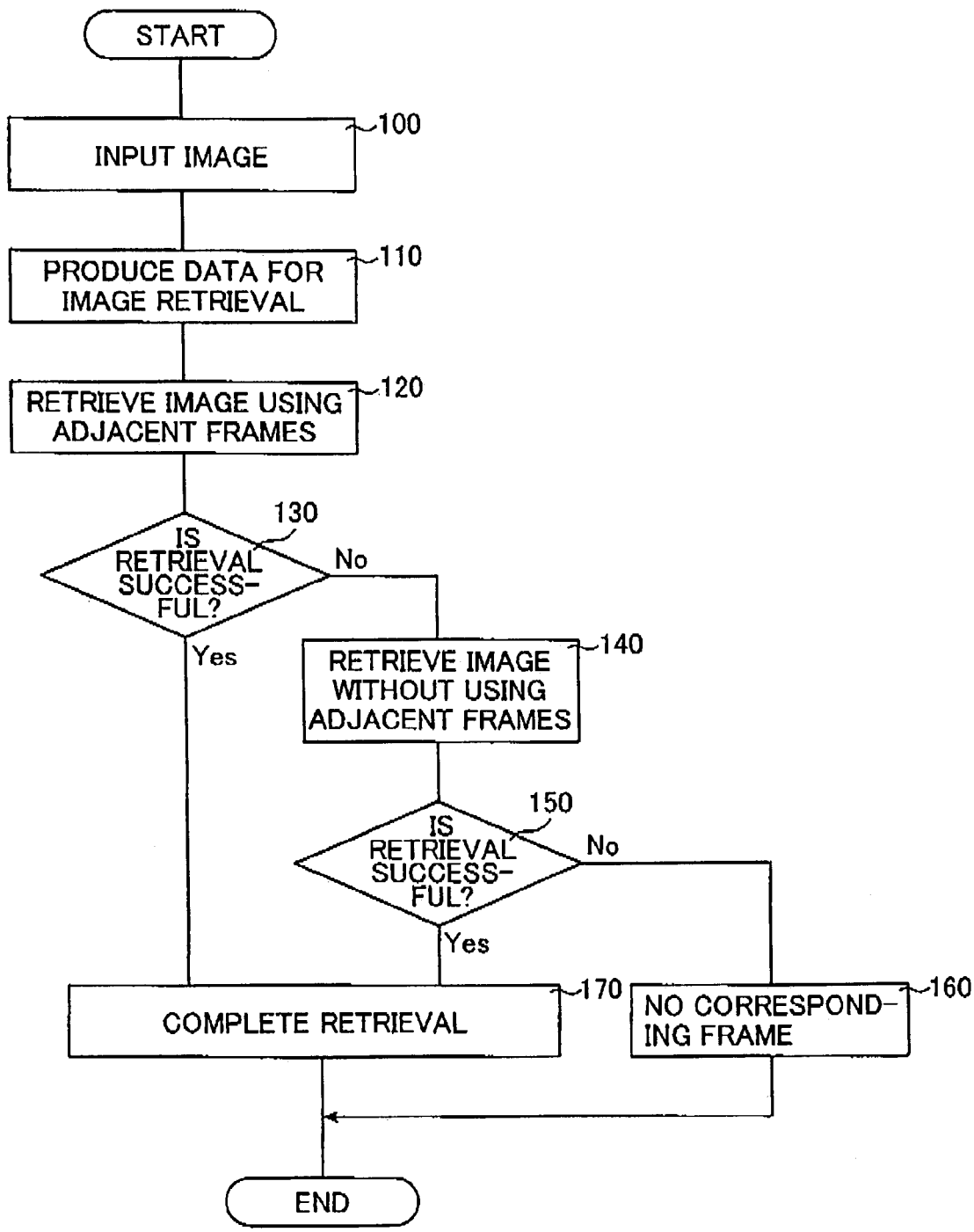
FIG. 4 is an exemplary flow chart showing the image retrieval method of the present invention.

Next, in the case of reprinting, in particular, an image retrieval method will be described in detail with reference to a flow chart of FIG. 4.

First, at step 100, image data on the frame at reorder is input. More specifically, the film F is prescanned by the scanner 12 so as to read an image which is requested to be reprinted as well as images in the adjacent frames. The read prescan data is transmitted to the image processor 14 along with the frame numbers.

Next, at step 110, the image characteristic quantity is calculated from the prescan data in the setup subsection 70 so as to produce the data for image retrieval. Then, at step 120, the image retrieval is performed by additionally using the frames adjacent (on the film) to the frame requested to be reprinted (that is to say, by using the data for image retrieval for the (frame) image requested to be reprinted and that for one or both of the adjacent frame images as well). The image processing information (condition) in the printing with film processing for the image designated to be reprinted is retrieved from the recording means (image database) 78.

An image retrieval method using the adjacent frame images (data for image retrieval therefor) in addition to the frame image of interest (data for image retrieval therefor) will be described with reference to FIG. 5. In the following is described a typical case where an image characteristic quantity is used as data for image retrieval, although the present invention is naturally not limited thereto.

Figure 5:
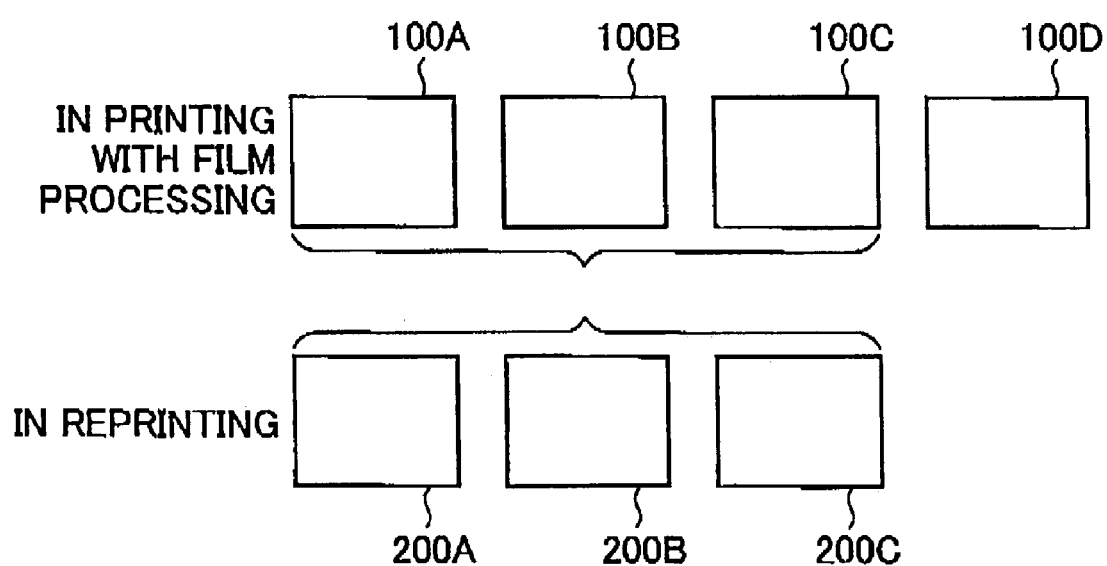
FIG. 5 is an illustration showing an example of images (frames) read from a film so as to show the image retrieval method in this embodiment.

In FIG. 5, images 100A to 100D are images (image data) read during the printing with film processing in the order of their arrangement on the film F, whereas images 200A to 200C are images (image data) read from the film F in the same manner during the reprinting in the order of arrangement of frames. The images having the same alphabet letter in the reference numerals are regarded as corresponding images.

It is assumed that the frame (image) designated to be reprinted is the image 200B. In this case, the corresponding image 100B printed in the printing with film processing is not retrieved by comparing the image characteristic quantity between only the image 200B and the images printed in the printing with film processing, but the images 200A and 200C adjacent to the image 200B (the image characteristic quantity of the images 200A and 200C) are also used for retrieval.

More specifically, not only the image 200B (the image characteristic quantity thereof) but also the images 200A and 200C (the image characteristic quantity thereof), that is, three images 200A to 200C (the image characteristic quantity thereof) are compared with the images printed in the printing with film processing (the image characteristic quantity thereof). By using not only the image 200B designated to be reprinted but also (one or both of) its adjacent frame images for comparison (in image characteristic quantity) as described above, it is confirmed that these images are arranged in this order. As a result, the retrieval of the designated image can be ensured even in the case where similar images are present.

It is assumed that, for example, the image 100C is an unprocessed (skipped) frame. If the image characteristic quantity of the image, which is read but is not processed (is skipped), is not registered in a database as conventional, the image characteristic quantity of the image 100C is not present in the database at the time of retrieval for reprinting. Therefore, upon retrieval using the image characteristic quantity of the image of interest and the adjacent frame images on its both sides, the images 200A, 200B and 200C are compared with the images 100A, 100B and 100D, respectively, in image characteristic quantity. Since the image 200C and the image 100D differ from each other in image characteristic quantity, these two sets of three images do not match in image characteristic quantity. Thus, in such a conventional case, the designated image 200B cannot be retrieved by the retrieval additionally using both of the adjacent frame images.

In the first aspect of the present invention, however, since the data for image retrieval such as image characteristic quantity data is registered in the image database, including even that for unprocessed (skipped) frames and unexposed frames, the image characteristic quantity data for the image 100C, which has been skipped in the printing with film processing, is also registered in the image database. Accordingly, in the retrieval of the first aspect of the present invention additionally using both of the adjacent frame images, the images 200A, 200B and 200C are compared with the images 100A, 100B and 100C, respectively, in image characteristic quantity. As a result, since these compared images turn out to be matching images, the image 200B can be retrieved. Therefore, retrieval errors due to the difference in image retrieval conditions between the printing with film processing and the reprinting can be prevented. In the first aspect of the present invention, it is also possible to use the image 200B and the adjacent frame image 200A or 200C on its one side only instead of using the image 200B and the images 200A and 200C on its both sides. In that case, the retrieval speed can be improved, although the retrieval accuracy decreased, leading to a reduction of such results that the retrieval is not successful.

The information for reprocessing to be registered in a database for the images in unexposed frames and unprocessed (skipped) frames may be any information as long as it enables to specify an image, so that data for image retrieval such as image characteristic quantity data is good enough to be used as such information. On the other hand, at least one selected from among image information, image data (especially, compressed image data), image processing information, and so forth may also be registered in a database as the information for reprocessing instead of, or in addition to, the data for image retrieval. If image processing information is to be registered, image processing should be performed on all images including those which are not output.

After retrieval of the image 100B corresponding to the designated image 200B, the image processing information (condition) for the retrieved image during the printing with film processing is read out of the database.

Alternatively, after fine adjustment of a frame position for reading an image or quarrying image data from one of the frames of a film is conducted, the image retrieval may be executed again to retrieve the image 100B so as to read out the image processing information (condition). As a result, the image retrieval errors can be prevented from occurring due to a shift of the frame position for reading an image or quarrying image data between the printing with film processing and the reprinting. To be more specific, in the case where the image 100B or 100C is read after the fine adjustment of the frame position in the printing with film processing, the data for image retrieval for the image 100B or 100C is such data for image retrieval as an image characteristic quantity obtained from the image data read after the fine adjustment of the frame position. Consequently, the retrieval condition will differ between the printing with film processing and the reprinting if the data for image retrieval such as image characteristic quantity is produced from the image data read without the fine adjustment of the frame position in the reprinting, resulting in unsuccessful retrieval.

In the case where the retrieval of the designated image is successfully completed at step 130 in this manner, the process proceeds to step 170 where the end of retrieval is determined. Then, the fine scan image is subjected to image processing using the information such as image processing condition just read out as a result of retrieval so as to output it as an output image.

In the case where the retrieval fails in the image retrieval additionally using the frame images adjacent to the designated image at step 130, the image retrieval without using the adjacent frame images (the image characteristic quantity thereof) is performed at step 140. More specifically, only with the comparison (in image characteristic quantity) of the designated image 200B, the image retrieval with a single frame is performed. The image retrieval with a single frame, that is performed in the event where the image is not retrieved in the image retrieval additionally using the adjacent frame images as described above, is effective in the case where the conditions differ between the printing with film processing and the reprinting. At the same time, such a retrieval makes it possible to ameliorate the degradation of image retrieval performance, which occurs in the case where the image retrieval is performed only on a single frame basis.

The image retrieval may be performed initially using the image characteristic quantity of three frame images, the image of interest and both of the adjacent frame images, then, using the image characteristic quantity of two frame images, the image of interest and one of the adjacent frame images, on the occasion of unsuccessful retrieval, and, if the retrieval is still unsuccessful, using the image characteristic quantity of only one frame image, namely the image of interest. The image retrieval using the image characteristic quantity of two frame images may be performed twice in succession, once with the image of interest and one of the adjacent frame images and once again with the image of interest and the other of the adjacent frame images.

At step 150, in the case where it is determined that the designated image 200B is successfully retrieved in the image retrieval with a single frame, the processing proceeds to step 170 where image processing is performed under the retrieved image processing conditions.

In the case where it is determined that the image retrieval fails at step 150, it is judged at step 160 that no corresponding frame is present. In this embodiment, as described above, in the event where the corresponding image cannot be retrieved in the image retrieval additionally using the adjacent frame images, the image retrieval using an image in a single frame is performed. However, it is not necessarily required to perform such image retrieval. Alternatively, the image retrieval additionally using the adjacent frame images and the image retrieval using only one frame image can be switched as needed.

In the second aspect of the present invention, unprocessed (skipped) frames and unexposed frames are not registered in an image database but processed frames (frames subjected to the printing processing or the digitizing processing) only.

In this aspect, similar to the first aspect as above, a certain and accurate retrieval can be achieved even in the retrieval using the image characteristic quantity of the frame image of interest and both or one of the adjacent frame images if neither of the adjacent frames is skipped in the printing with film processing.

As described before, however, if either or both of the adjacent frames are skipped in the printing with film processing, that is to say, the image which is skipped in the printing with film processing, for example, image 100C, is one adjacent frame image, the image retrieval using the image characteristic quantity of three or two frame images, namely the frame image of interest and both or one of the adjacent frame images, can not be successfully carried out because the image characteristic quantity data for the image 100C is not registered in the image database. In that case, as also described before, the image retrieval is performed without using the image characteristic quantity of either of the adjacent frame images. In other words, only the image characteristic quantity of the designated image 200B is compared with the image 100B (the image characteristic quantity thereof) so as to perform the image retrieval with a single frame.

In this aspect also, the image retrieval may be performed using the image characteristic quantity of two frame images, the frame image of interest and one of the adjacent frame images, if the image retrieval using the image characteristic quantity of three frame images, the frame image of interest and both of the adjacent frame images, is not successful. In the case where the image retrieval with two frame images is also unsuccessful, the image retrieval may be performed using the image characteristic quantity of one frame image, namely the frame image of interest, or alternatively, initially using the image characteristic quantity of two frame images, the frame image of interest and the other adjacent frame image this time, and only if even such a retrieval fails, then solely using the image characteristic quantity of the frame image of interest.

In this way, the image retrieval is usually carried out with high accuracy by using the adjacent frame images in addition to the frame image of interest and only if such a usual retrieval is not successful, the image retrieval with a single frame is performed. As a consequence, retrieval errors can be reduced in general and such results that the retrieval is not successful can also be reduced, even though only processed frames are registered. Moreover, the degradation of image retrieval performance, which occurs in the case where the image retrieval is performed only on a single frame basis, can be ameliorated. As a matter of course, the retrieval method as described above is effective in the case where the conditions differ between the printing with film processing and the reprinting.

In the first and second aspects of the present invention, the image retrieval using the frame image of interest and the adjacent frame images on its both sides or the adjacent frame image on its one side (data for image retrieval therefor) is disadvantageous in its low retrieval speed as compared with the image retrieval using only one frame image (data for image retrieval therefor). Moreover, since the conditions to be compared should be the same, even a frame, which is skipped in scanning, or an unexposed frame should also be registered in the database. However, such image retrieval is advantageous in high retrieval performance.

On the other hand, the image retrieval with a single frame without using any adjacent frame images is disadvantageous in low retrieval performance, but is advantageous in high retrieval speed. Therefore, the image retrieval can be appropriately selected between the image retrieval using the adjacent frame images in addition to the frame image of interest and that using only one frame, so that the image retrieval performance and the retrieval speed can be further improved.

In the case of image retrieval using the adjacent frame images in addition to the frame image of interest as described above, when the designated image is a frame situated on the edge of the film F, the designated image has an adjacent frame only on its one side. Therefore, it is preferred that the image retrieval is performed only with the images of the two frames adjacent to each other.

As described above, according to the present invention, the image retrieval is performed using three frames in total, the frame of interest and the frames on its both sides, when the frame of interest is accompanied by the preceding frame and the following frame as the adjacent frames; using two frames in total, the frame of interest and the frame on its one side, when the frame of interest is accompanied by either the preceding frame or the following frame, each as an adjacent frame; and using only one frame, namely the frame of interest, when the frame of interest is accompanied by neither of the preceding frame and the following frame as the adjacent frames. The present invention is, however, not limited thereto. The image retrieval may be performed using four or more frames in total, namely the frame of interest and three or more adjacent frames, or alternatively, using frames in a number varying with the case of processing or the ordering. If the number of the adjacent frames and consequently of the frames to be used for retrieval is increased, the retrieval speed (processing speed) is decreased, although the retrieval accuracy and the retrieval performance improved. Therefore, it is preferred in general that the total number of the frames to be used for the image retrieval, including the frame of interest, is up to three.

In the present invention, it is more preferable that the number of the adjacent frames or the total number of the frames to be used for the image retrieval is previously made capable of being designated or selected for setting.

As described above, in the first aspect of the present invention, since an image of an unexposed frame or an unprocessed (skipped) frame (information for reprocessing of the image and data related thereto) is registered in a database, the same image retrieval conditions can be set between the printing with film processing and the reprinting. By executing the image retrieval additionally using the frame images adjacent to the image designated to be reprocessed, the retrieval performance can be enhanced.

After fine adjustment of the frame position for reading an image or quarrying image data from one of the frames of a film, the image retrieval is performed again. As a result, the occurrence of retrieval errors caused by frame detection errors due to a frame position shift can be prevented.

Furthermore, in the event where the image retrieval additionally using the adjacent frame images is not successful, the image retrieval using a single frame image is performed. Accordingly, the image retrieval of the present invention can effectively deal with skipped frames, unexposed frames, the order in which an image is printed, cutting, the fine adjustment of the frame position, and so forth in the case where the image retrieval conditions are different between the printing with film processing and the reprinting.

According to the second aspect of the present invention, a certain image retrieval can be performed, as decreasing unsuccessful retrieval, and the retrieval efficiency and the retrieval speed can be totally improved. Moreover, in this aspect also, the retrieval errors and the like due to the frame position shift can be prevented by newly performing the image retrieval after the fine adjustment of the frame position.

Although the image retrieval method of the present invention has been described above in detail with reference to various embodiments thereof, it is apparent that the present invention is not limited to the above-described embodiments and various modifications and changes may be possible as long as they do not depart from the scope of the present invention.

As described above, according to the present invention, the image retrieval using the frame images adjacent to the designated image in addition to the designated image (namely, the data for image retrieval for these images) is performed to enhance the retrieval performance. Moreover, the image retrieval with only a single frame is performed after the image retrieval additionally using the adjacent frame images (data for image retrieval therefor), so that the image retrieval can be efficiently achieved even in the case where the image retrieval conditions in printing with film processing differ from those in the reprinting.

What is claimed is:

1. A method for retrieving an image from a database, wherein a plurality of images photographed on a film are photoelectrically read and one among said plurality of images thus input is subjected to image processing to be output as a processed image, comprising:

causing image processing information concerning the image processing performed on an image to be output as said processed image on one hand, and data for retrieval used for retrieving said image on the other, to correspond to each other and registering them in said database in advance for each of images subjected to the image processing to be output as processed images, with registering being carried out in an order corresponding to that of arrangement of frames of said film;

registering said data for retrieval even for unprocessed images in said database in the order corresponding to that of arrangement of frames of said film;

reading, upon reprocessing, from said film a plurality of images including an image to be reprocessed;

calculating data for retrieval for said plurality of images thus input; and retrieving said image processing information for said image to be reprocessed from said database using said data for retrieval for said image to be reprocessed and for an image in at least one of frames adjacent to said image to be reprocessed on said film.

2. The method for retrieving the image according to claim 1, wherein, in addition to said data for retrieval for the image or said data for retrieval and said image processing information for the image, at least one selected from among image information on said image, image data on said image, and compressed image data on said image is recorded in said database, as being caused to correspond to said data for retrieval or said image processing information.

3. The method for retrieving the image according to claim 1, wherein at least one selected from among an image characteristic quantity of said image, image information on said image, and compressed image data on said image is used as said data for retrieval for said image.

4. The method for retrieving the image according to claim 1, wherein an image characteristic quantity of said image is used as said data for retrieval for said image.

5. The method for retrieving the image according to claim 1, wherein, when said reprocessing is to be performed, a frame position for reading said image to be reprocessed from one of frames of said film is subjected to fine adjustment, said image to be reprocessed is then read, data for retrieval used for retrieving said image thus input is calculated, and, using the data for retrieval calculated, retrieval within said database is again performed.

6. The method for retrieving the image according to claim 1, wherein said data for retrieval registered for said images are arranged in said database in an order same as that of arrangement of the images on said film.

7. The method for retrieving the image according to claim 1, wherein, when said image processing information on said image to be reprocessed is retrieved from said database, retrieval is performed initially using the data for retrieval for said image to be reprocessed and the image in at least one of said frames adjacent to said image to be reprocessed on said film and if the retrieval is not successful, then using at least the data for retrieval for said image to be reprocessed and without using the data for retrieval for said image in at least one of said frames adjacent to said image to be reprocessed.

8. A method for retrieving an image from a database, wherein a plurality of images photographed on a film are photoelectrically read and one among a plurality of images thus input is subjected to image processing to be output as a processed image, comprising:

causing image processing information concerning the image processing performed on an image to be output as said processed image on one hand, and data for retrieval used for retrieving said image on the other, to correspond to each other and registering them in said database in advance for each of images subjected to the image processing to be output as processed images and not for unprocessed images, with registering being carried out in an order corresponding to that of arrangement of frames of said film;

reading, upon reprocessing, from said film a plurality of images including an image to be reprocessed;

calculating data for retrieval used for retrieving said plurality of images thus input; and retrieving said image processing information for said image to be reprocessed from said database using said data for retrieval for said image to be reprocessed and for an image in at least one of frames adjacent to said image to be reprocessed on said film.

9. The method for retrieving the image according to claim 8, wherein, in addition to said data for retrieval and said image processing information for the image, at least one selected from among image information on said image, image data on said image, and compressed image data on said image is recorded in said database, as being caused to correspond to said data for retrieval or said image processing information.

10. The method for retrieving the image according to claim 8, wherein at least one selected from among an image characteristic quantity of said image, image information on said image, and compressed image data on said image is used as said data for retrieval for the image.

11. The method for retrieving the image according to claim 8, wherein an image characteristic quantity of said image is used as said data for retrieval for the image.

12. The method for retrieving the image according to claim 8, wherein, when said reprocessing is to be performed, a frame position for reading said image to be reprocessed from one of frames of said film is subjected to fine adjustment, said image to be reprocessed is then read, data for retrieval used for retrieving said image thus input is calculated, and, using the data for retrieval calculated, retrieval within said database is again performed.

13. The method for retrieving the image according to claim 8, wherein said data for retrieval registered for said images are arranged in said database in an order same as that of arrangement of the images on said film.

14. The method for retrieving the image according to claim 8, wherein, when said image processing information on said image to be reprocessed is retrieved from said database, retrieval is performed initially using the data for retrieval for said image to be reprocessed and the image in at least one of said frames adjacent to said image to be reprocessed on said film and if the retrieval is not successful, then using at least the data for retrieval for said image to be reprocessed and without using the data for retrieval for said image in at least one of said frames adjacent to said image to be reprocessed.

* * * * *